Oct. 25, 1966  W. M. HANNEMAN ETAL  3,280,412
METHOD AND APPARATUS FOR SLOTTING AND POINTING SCREWS
Filed Oct. 14, 1963  11 Sheets-Sheet 7

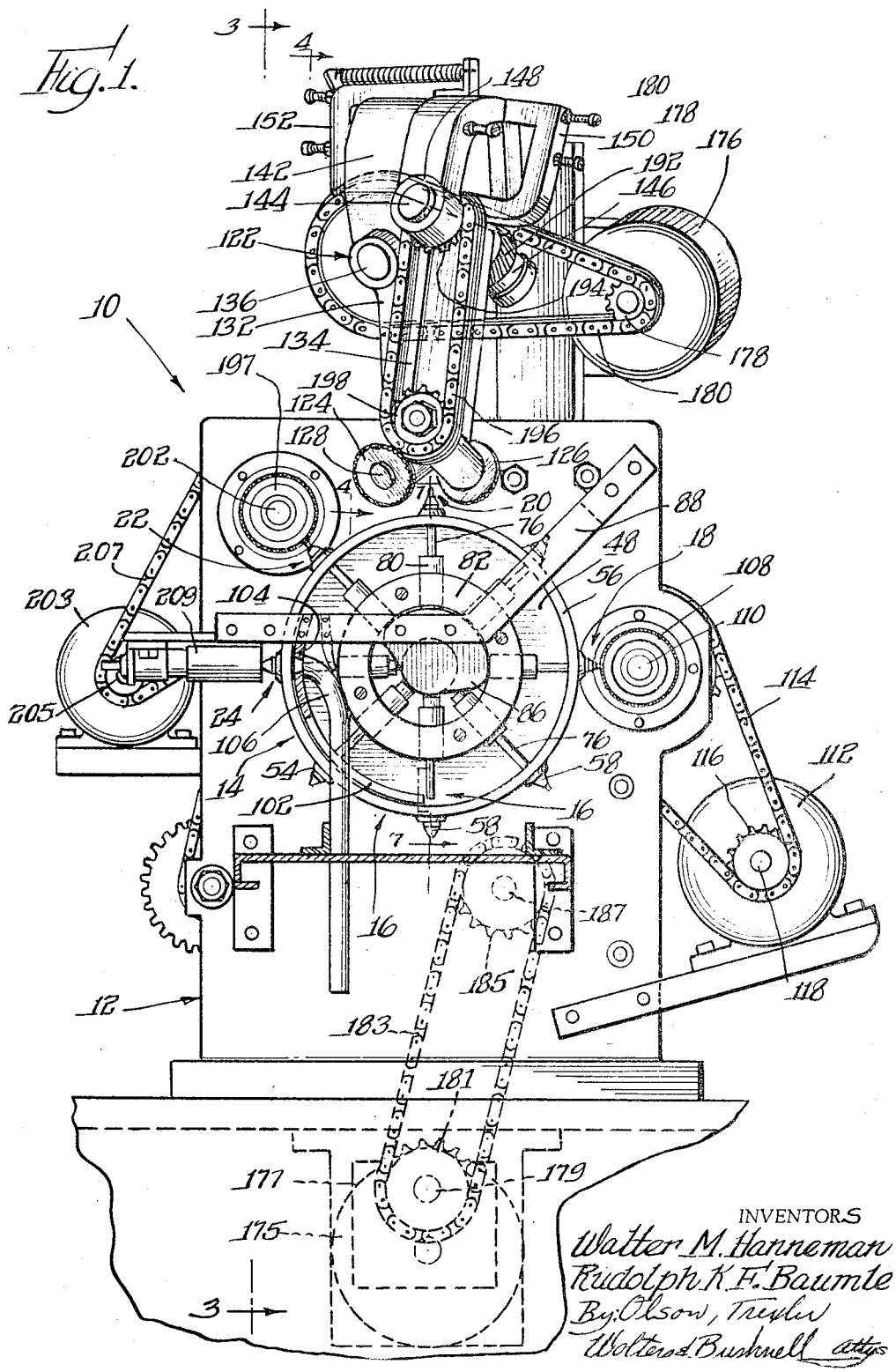

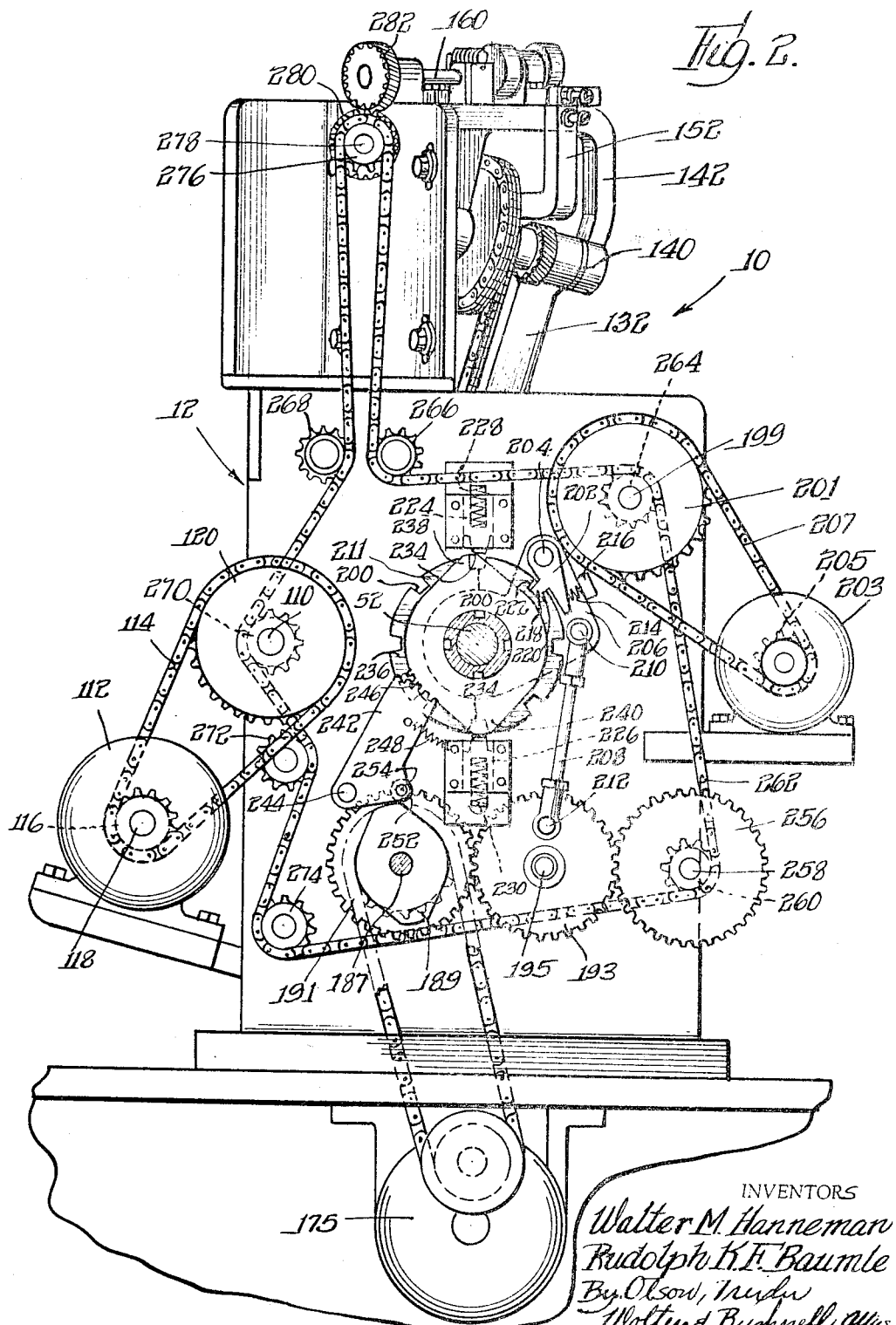

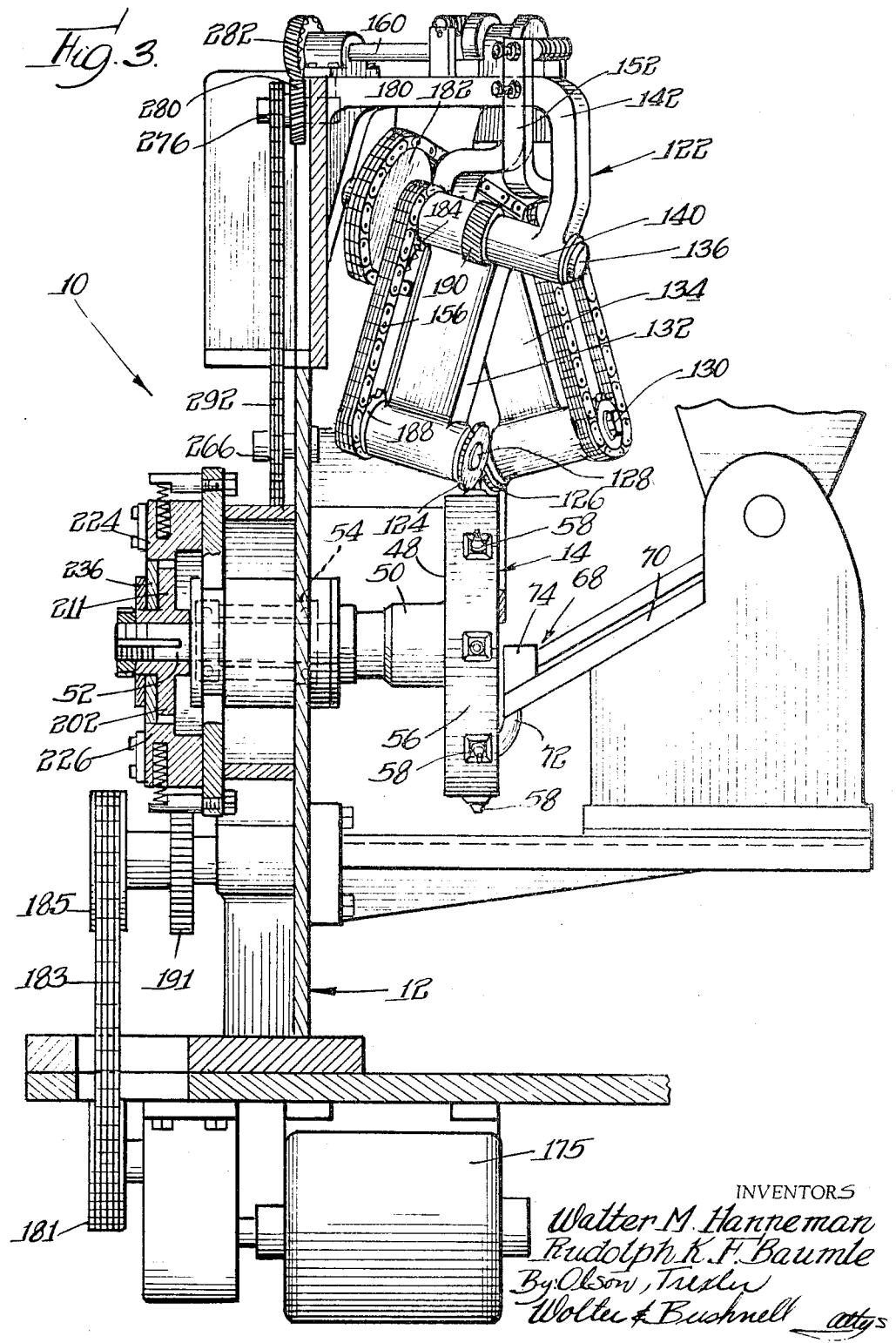

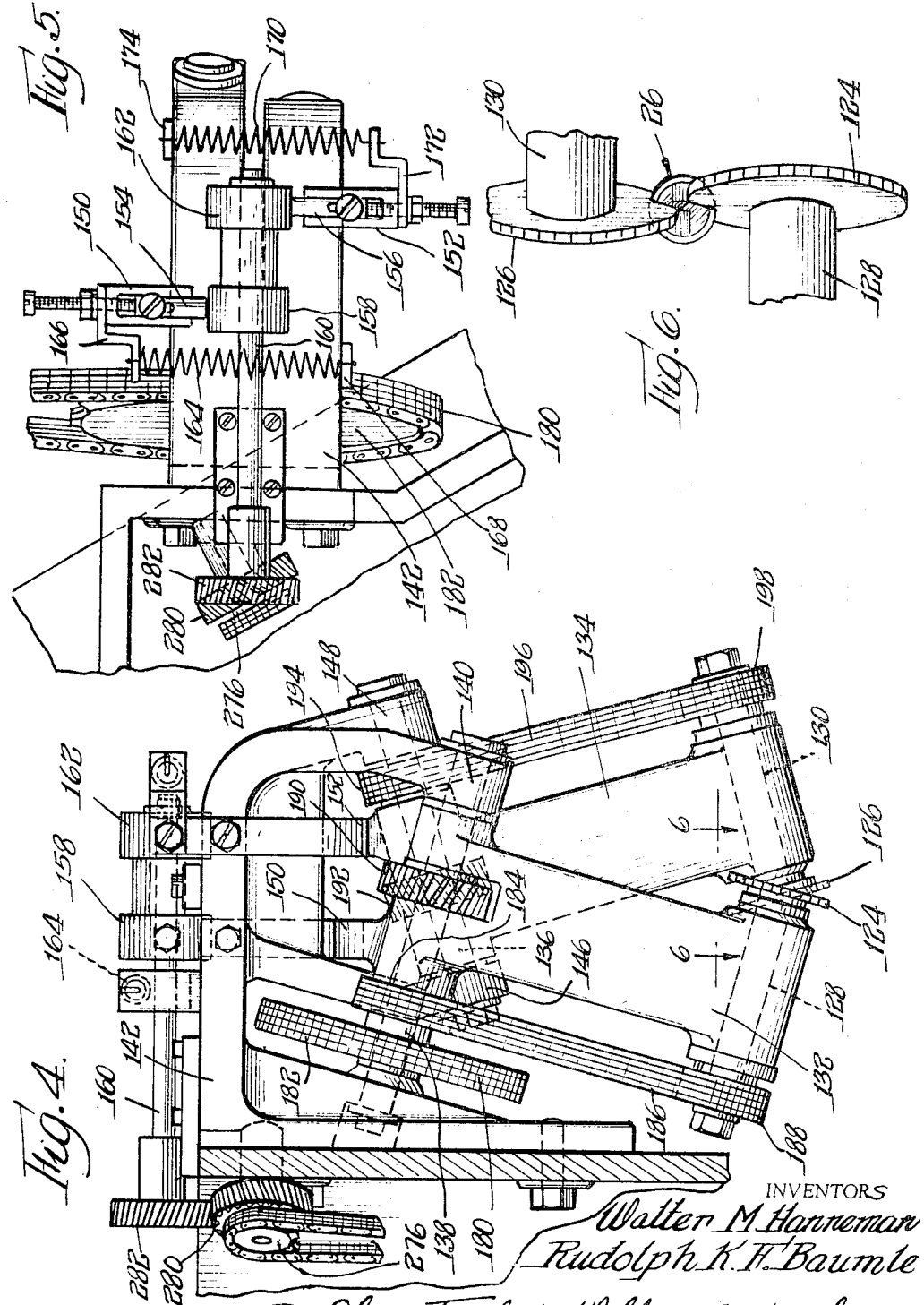

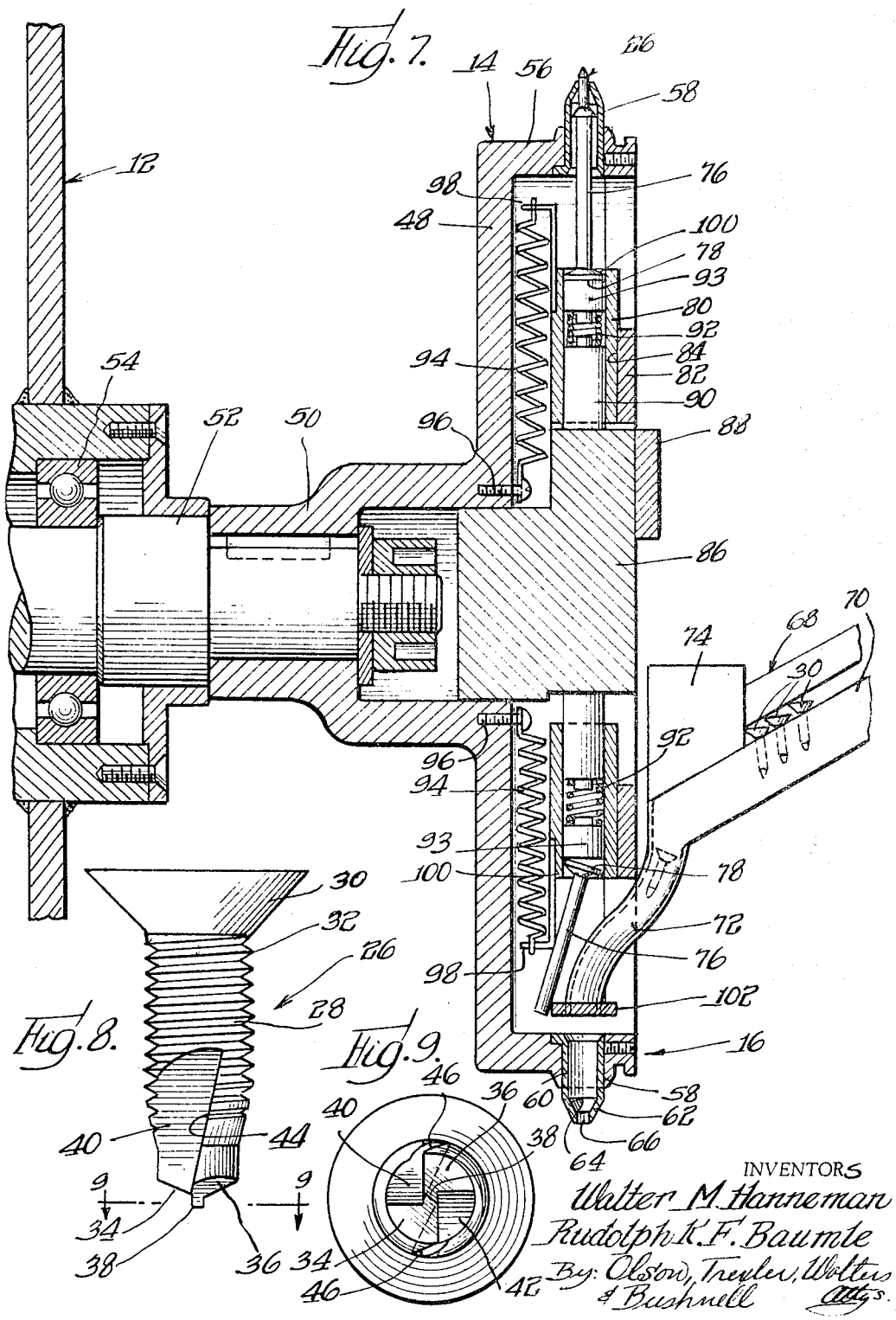

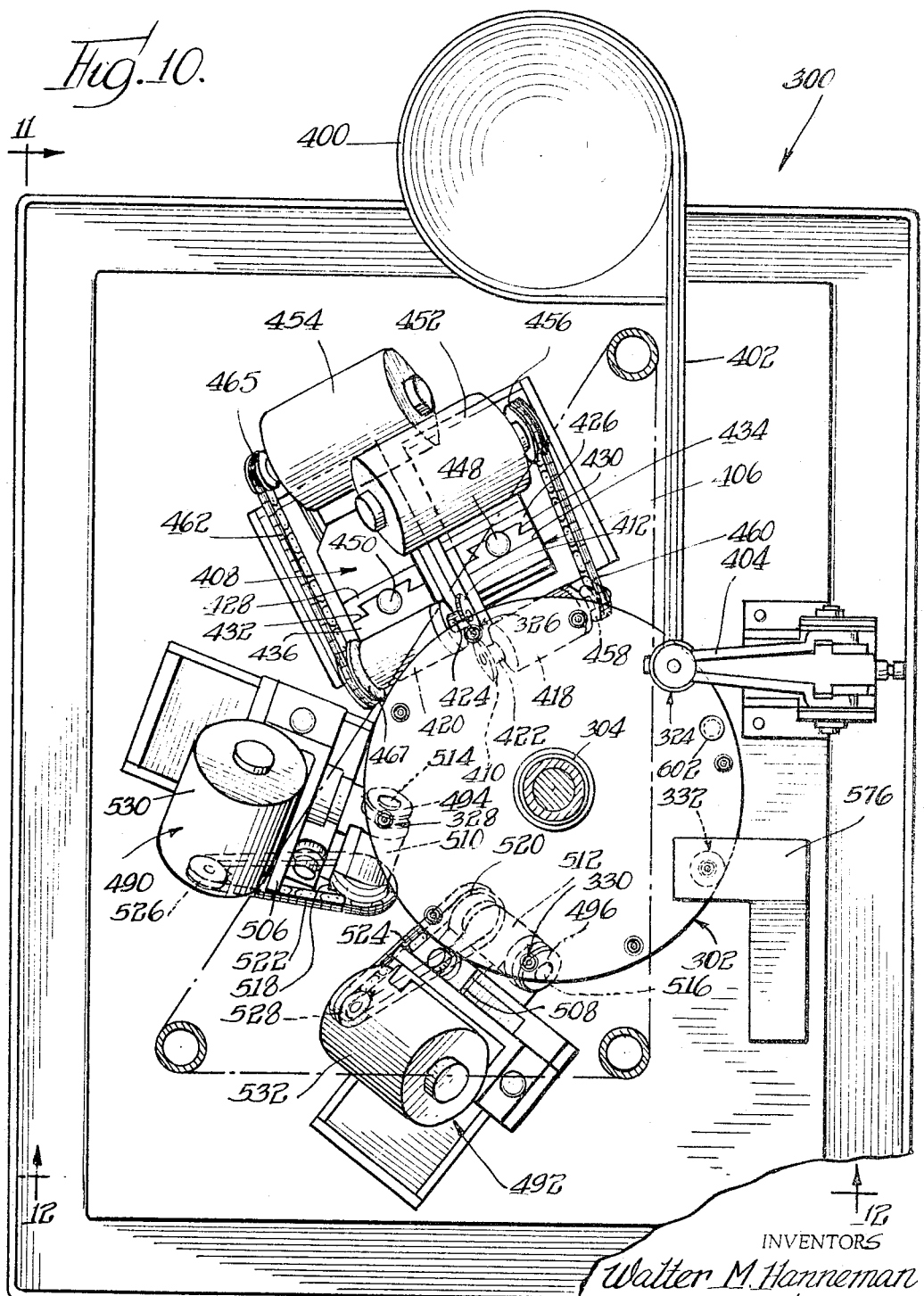

INVENTORS
Walter M. Hanneman
Rudolph K. F. Baumle
By: Olson, Trexler, Wolters & Bushnell
Attys

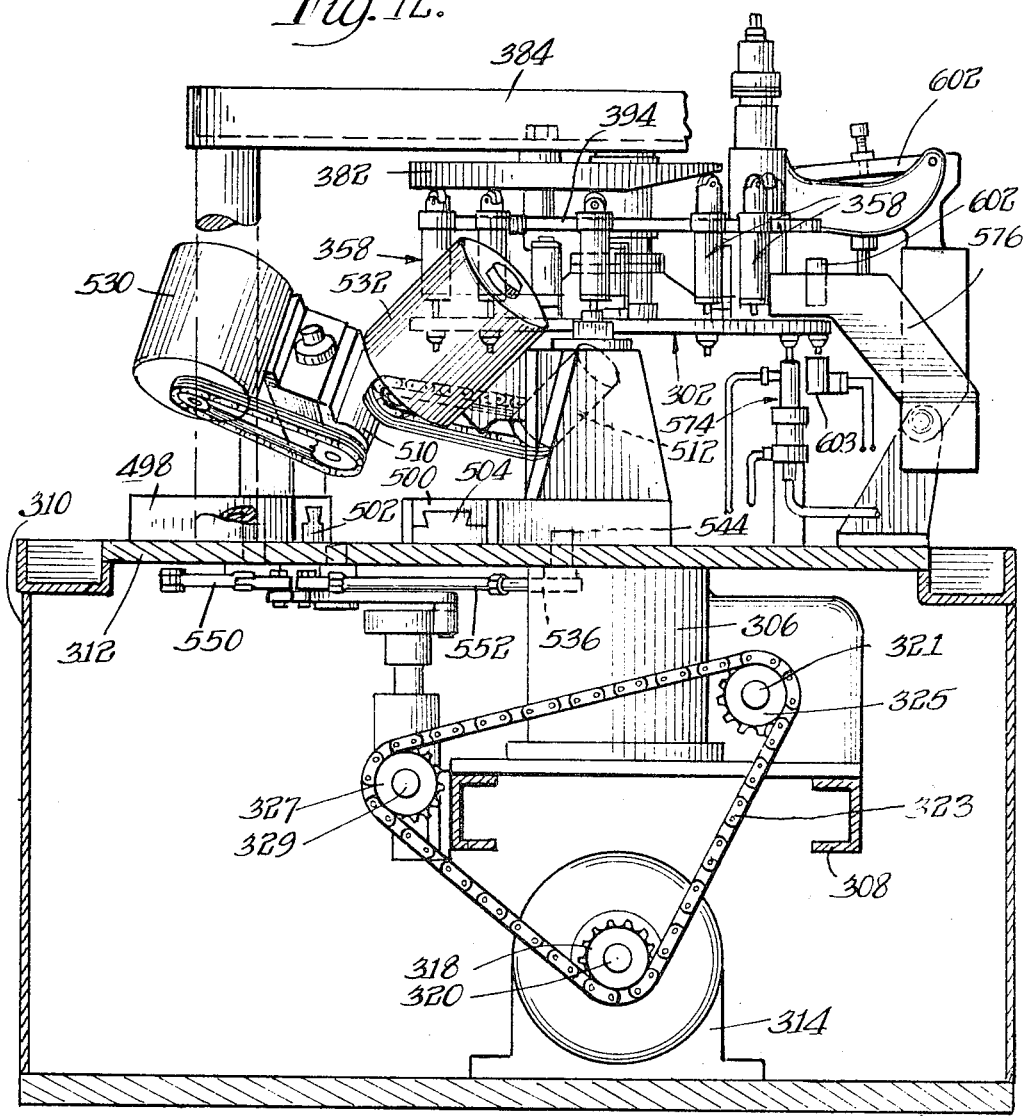
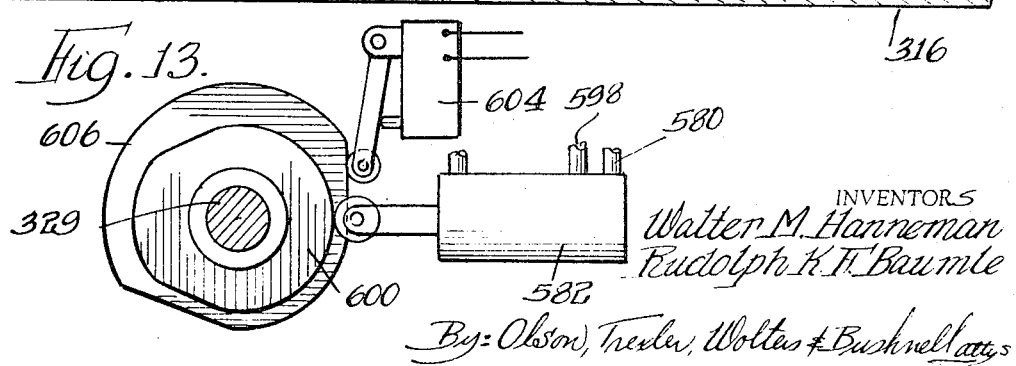

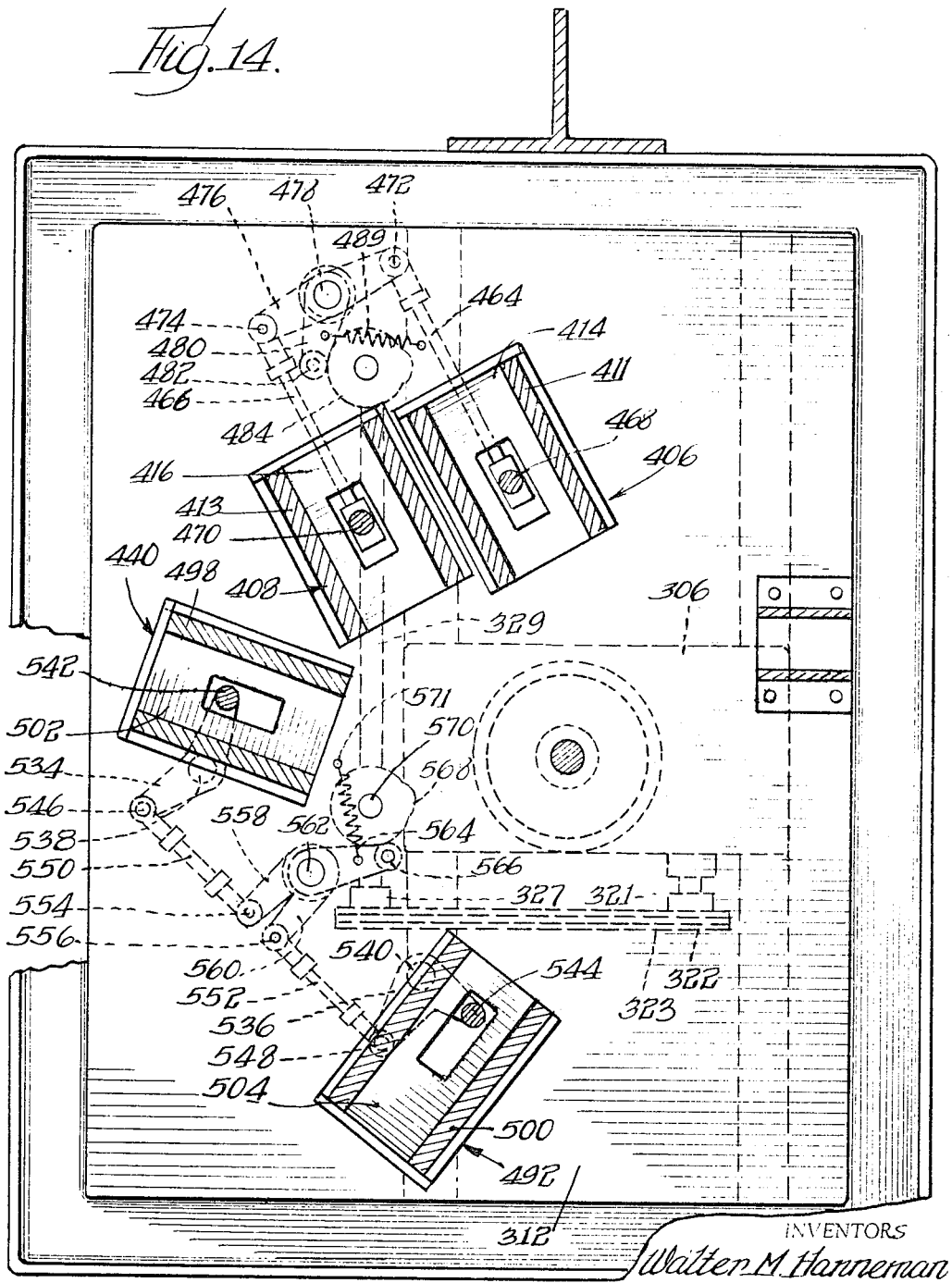

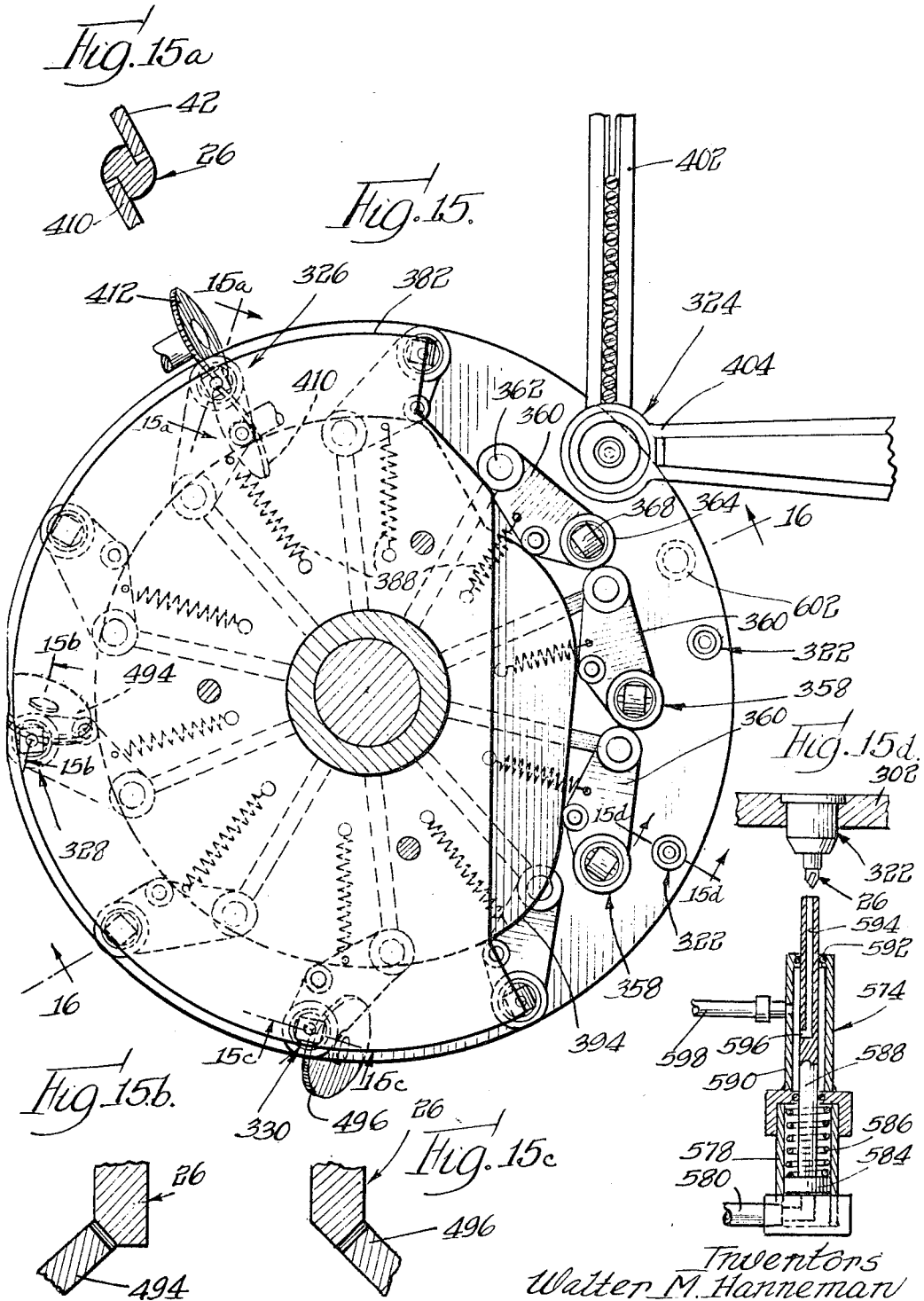

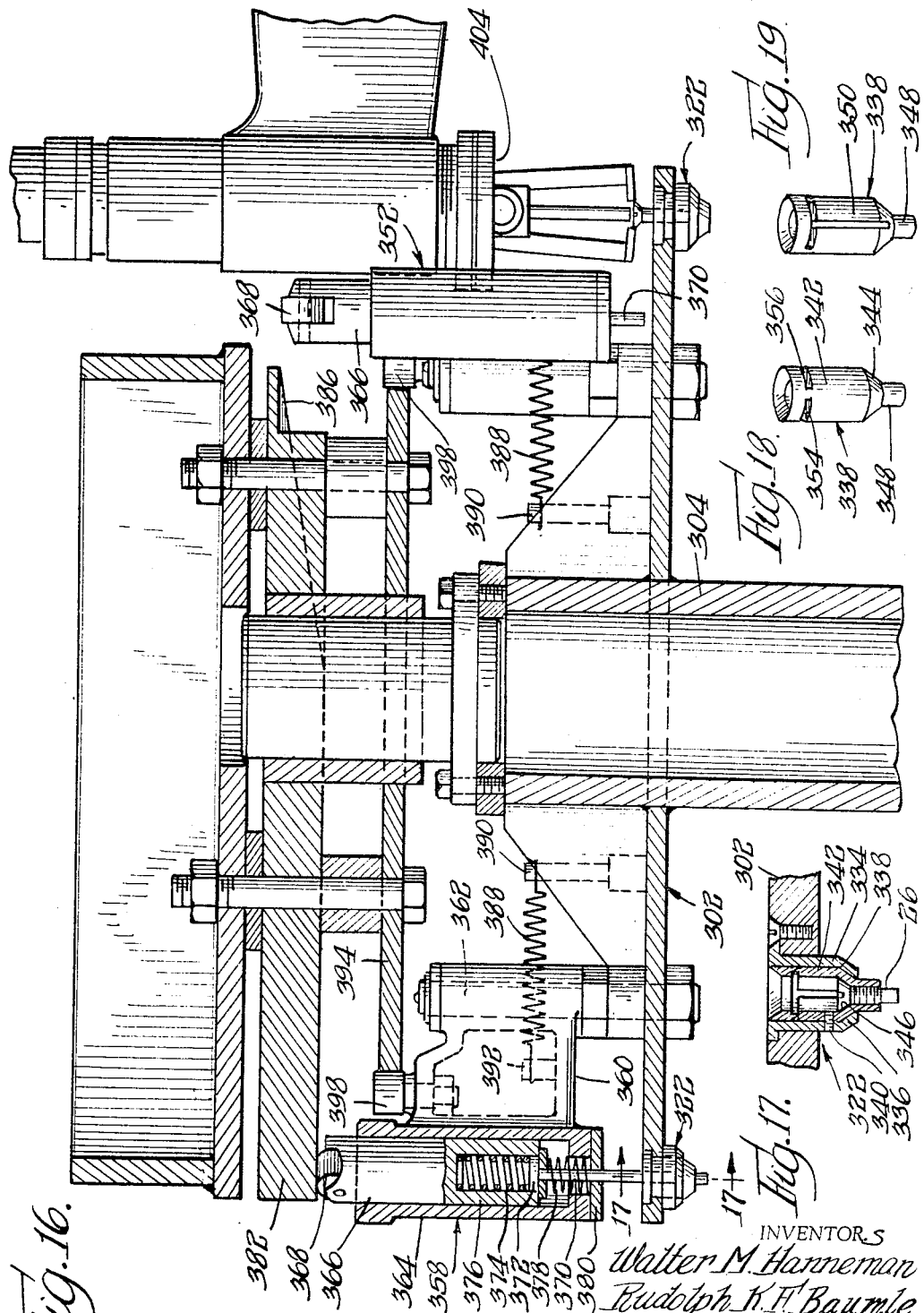

United States Patent Office 3,280,412
Patented Oct. 25, 1966

3,280,412
METHOD AND APPARATUS FOR SLOTTING AND POINTING SCREWS
Walter M. Hanneman, Wheaton, and Rudolph K. F. Baumle, Elgin, Ill., assignors to Illinois Tool Works Inc., Chicago, Ill., a corporation of Delaware
Filed Oct. 14, 1963, Ser. No. 315,753
45 Claims. (Cl. 10—2)

The present invention relates to a novel method and apparatus for making screws, and more specifically to a novel method and apparatus for making drilling and thread cutting screws.

Apparatus for forming drilling and thread cutting screws have heretofore been suggested and while certain of such apparatus have been generally successful and have enabled a commercially acceptable screw to be provided, the present application contemplates further improvements for facilitating production, minimizing manufacturing costs of the screws and providing screws having a more efficient drilling and thread cutting action.

An important object of the present invention is to provide a novel method and apparatus for producing drilling and tapping screws accurately and at high production rates.

A further object of the present invention is to provide a novel apparatus of the above-described type which may be relatively easily constructed and maintained at which it is efficient in operation.

A more specific object of the present invention is to provide an apparatus of the above-described type having novel means for receiving and retaining screw blanks in a predetermined relationship while the blanks are fed through successive work stations for enabling drilling and tapping edges to be formed on the blanks in an accurate and predetermined manner.

A further important object of the present invention is to provide a novel method apparatus of the above-described type capable of simultaneously forming oppositely inclined slots or flutes in a screw shank for providing the screw with more effective cutting edges.

Other objects and advantages of the present invention will become apparent from the following description and the accompanying drawings wherein;

FIG. 1 is a front elevational view of an apparatus incorporating features of the present invention;

FIG. 2 is a back elevational view of the apparatus shown in FIG. 1;

FIG. 3 is a sectional view taken along line 3—3 in FIG. 1;

FIG. 4 is an enlarged fragmentary sectional view taken along line 4—4 in FIG. 1;

FIG. 5 is a fragmentary plan view of a portion of the apparatus shown in FIG. 4;

FIG. 6 is an enlarged fragmentary view taken generally along line 6—6 in FIG. 4 and showing the manner in which the rotary cutters engage a screw blank;

FIG. 7 is an enlarged fragmentary sectional view taken generally along line 7—7 in FIG. 1;

FIG. 8 is an enlarged elevational view showing a screw adapted to be formed with apparatus constructed in accordance with the present invention;

FIG. 9 is an entering end view of the screw shown in FIG. 8;

FIG. 10 is a plan view showing an apparatus embodying a modified form of the present invention;

FIG. 12 is a sectional view taken along line 12—12 in FIG. 10;

FIG. 13 is an enlarged fragmentary sectional view taken along line 13—13 in FIG. 11;

FIG. 14 is a sectional view taken along line 14—14 in FIG. 11;

FIG. 15 is a fragmentary sectional view taken along line 15—15 in FIG. 11;

FIG. 15a is a fragmentary sectional view taken along line 15a—15a in FIG. 15;

FIG. 15b is a fragmentary sectional view taken along line 15b—15b in FIG. 15;

FIG. 15c is a fragmentary sectional view taken along line 15c—15c in FIG. 15;

FIG. 15d is a fragmentary sectional view taken along line 15d—15d in FIG. 15;

FIG. 16 is an enlarged fragmentary sectional view taken generally along lines 16—16 in FIG. 15;

FIG. 17 is an enlarged fragmentary sectional view taken generally along line 17—17 in FIG. 16;

FIG. 18 is a perspective view showing a tubular pocket or collet member for receiving screw blanks utilized in the present invention; and FIG. 19 is a perspective view showing the novel collet or pocket member turned 90° from position shown in FIG. 18.

Figure 11:
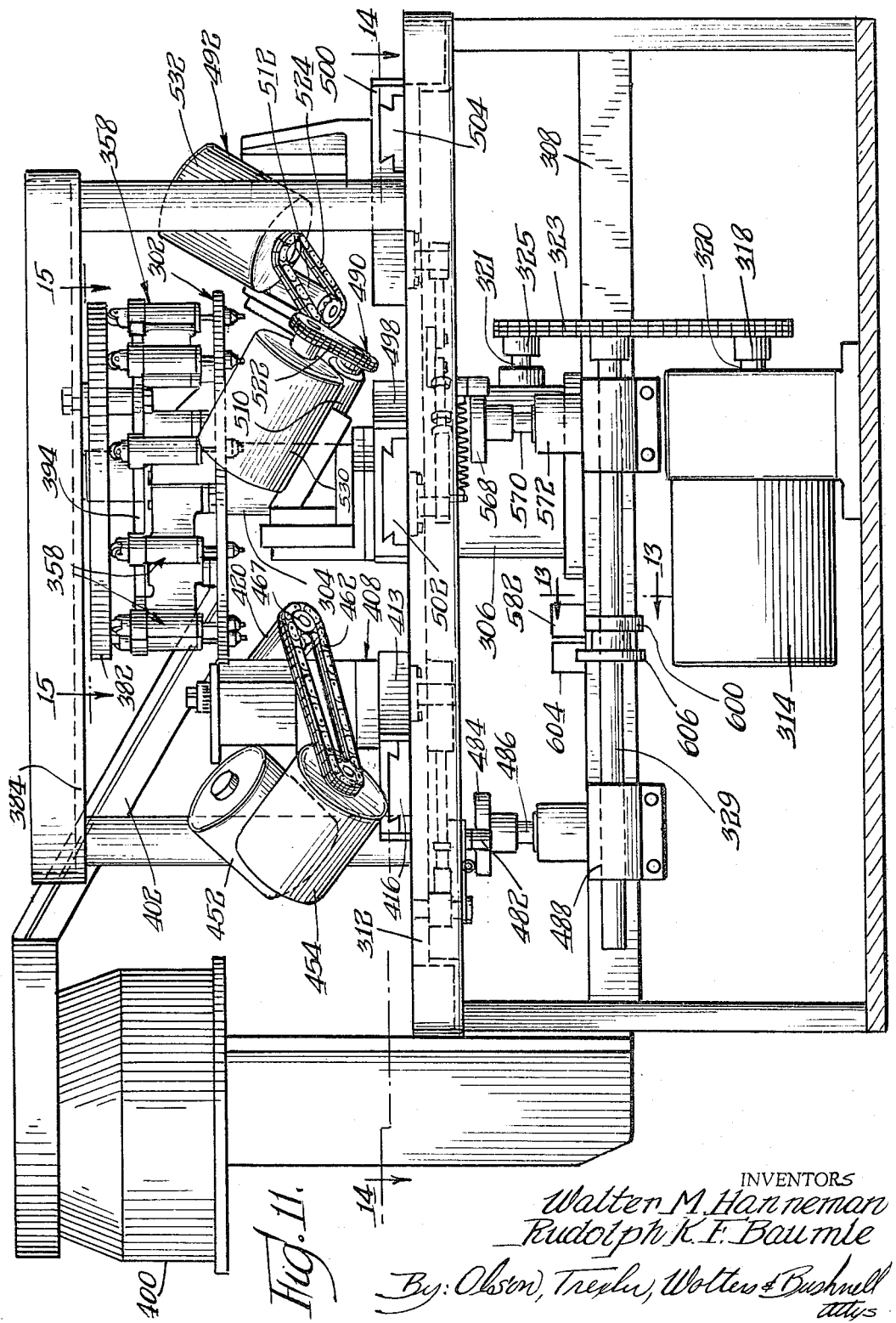
FIG. 11 is a side elevational view taken generally along line 11—11 in FIG. 10.

Referring now more specifically to the drawings wherein like parts are designated by the same numerals throughout the various figures, an apparatus 10 incorporating one embodiment of the present invention is shown in FIGS. 1 through 7 and comprises a frame structure 12 which carries a rotary conveyor or turret means 14 which will be described more in detail below. The turret is adapted to convey successive screw blanks from a loading station 16 to a first work station 18, a second work station 20, a third work station 22 and a discharge station 24. Means are provided at each of the work stations for forming the successive screw blanks to provide finished screws 26 having the construction shown best in FIGS. 8 and 9.

Each screw 26 has an elongated shank 28 extending axially from a head portion 30 and provided with a plurality of integral helical convolutions 32. An entering end portion of the shank 28 is formed with opposite side beveled surfaces 34 and 36 at the work station 18, which beveled surfaces intersect each other along a straight line or ridge 38. Slots 40 and 42 are formed in opposite sides of the screw shank at the work station 20 in a manner such that the slots traverse the beveled surfaces 34 and 36 and a portion of the helical thread convolutions for providing drilling and thread cutting edges 44 and 46. In accordance with one feature of the present invention the apparatus 10 is specially constructed so that the slots 40 and 42 are formed for extending generally axially of the shank but at the same time in oppositely inclined relationship with respect to the shank axis. As a result the cutting edges 44 and 46 are inclined with respect to the axis of the screw for improving the cutting action.

As shown in FIGS. 1, 3 and 7, the rotary conveyor or turret 14 comprises an annular disc 48 having a hub portion 50 fixed on a rotatable shaft 52 which, in turn, is rotatably mounted by suitable bearing means 54 supported by the frame structure 12. The turret is mounted for rotation about a substantially horizontal axis so that the successive screws 26 are conveyed around an arcuate path of travel disposed substantially in a vertical plane.

The turret 14 is provided with an annular flange 56 extending axially from a peripheral margin of the disc 48. Screw accommodating pocket members 58 are mounted in radially extending apertures through the flange 56 at predetermined circumferentially spaced locations. As shown best in FIG. 1, the turret is provided with eight equally spaced screw accommodating pocket members 58.

Each of the pocket members 58 includes a relatively large diameter tubular portion 60 having an internal diameter larger than the diameters of both the shank and the head of the screw 26 for enabling a screw freely to enter the pocket element as indicated in the lower portion of FIG. 7 and to project through the pocket element as shown in the upper portion of FIG. 7. Each pocket element 58 is formed with a tapering outer end portion 62 providing a conical seat 64 adapted to engage the head of a screw member. An aperture 66 opens through the outer end of the tapering section 62, which aperture has a diameter similar to but slightly larger than the diameter of the screw shank for enabling the screw shank to project through the aperture and radially outwardly from the pocket element when the screw head is in engagement with the seat 64.

As indicated in FIGS. 1 and 7, the loading station 16 is located at the lower side of the circular path of travel of the pocket element 58 or, in other words, the loading station is positioned so that a pocket element 58 extends vertically downwardly during a loading operation. Feeding means 68 is provided for directing successive screws 26 from a hopper or other source of supply, not shown, to the loading station. The feed means 68 comprises a track 70 adapted to engage beneath the heads of screws 26 so that the screws slide down the track with their shank portions extending downwardly. A funnel element 72 is mounted at the lower end of the track 70 for receiving successive screws from the track and directing the screws in a direction extending generally axially of the screws to the open upper end of a pocket element 58 located at the loading station 16. An escapement mechanism 74 having finger or gate elements is provided at the lower end of the track 70 for releasing a single screw at a time into the funnel 72. Suitable means, not shown, is provided for actuating the escapement mechanism in timed relationship with the indexing movement of the turret.

The turret structure 14 is provided with means for positively retaining the screw elements in the pocket members 58 during the forming and processing of the beveled surfaces 34 and 36 and the slots or flutes 40 and 42 so that the cutting edges are formed in precisely the desired manner. The means for releasably retaining or clamping the screws comprises radially extending plungers 76 respectively associated with each of the pocket members 58. Each of the plungers has a reduced diameter outer end portion which is adapted to extend into an associated pocket member 58 for clamping engagement against an end of a screw member and wedging the screw member against the beveled seat 64. Each of the plungers 76 also has an enlarged head portion 78 slidably disposed in a tubular radially extending guide and slide member 80 which is supported by a ring member 82 that is in turn secured to the disc 48. Each of the members 80 is slidably retained for radial movement in a slot 84 formed in the ring member 82.

In order to actuate the plunger 76 and the sliding guide members 80, a fixed cam 86 is centrally disposed within a turret and is supported by a bracket 88 which in turn is fixed by suitable means to the frame structure 12. Cam followers 90 and slide blocks 93 are slidably disposed within each of the members 80 and compression springs 92 are arranged between each pair of cam followers 90 and slide blocks 93, which blocks 93 abut the plunger heads 78. It will be apparent that when a cam follower member 90 is shifted radially outwardly by the cam 86, its associated plunger 76 will also be shifted radially outwardly for clamping a screw within an associate pocket member 58. The intermediate spring 92 permits a resilient clamping action to be obtained so as to prevent injury to the apparatus in the event a screw becomes twisted or jammed within a pocket member 58. However, the springs 92 are sufficiently strong so that a properly seated screw member in a pocket 58 is effectively positively clamped against the seat 64 for preventing axial withdrawal of the screw or rotation of the screw while the outer end of the screw is being worked upon at any of the work stations.

Tension springs 94 are provided for urging the plunger assemblies including the elements 76, 80, 90, 92, and 93 radially inwardly for maintaining the cam follower elements 90 in engagement with surface of the cam 86. Each of the springs 94 has its inner end fixed by means of a screw 96 or other suitable means to an inner marginal portion of the turret disc 48. An outer end of each spring 94 is connected to a finger element 98 which in turn is fixed to an outer end portion of an associated slide member 80. Each of the slide or guide members 80 has an inturned flange 100 at its outer end for engagement with the enlarged head 78 of an associate plunger element so that the plunger elements, springs, 92 and cam followers 90 are resiliently biased radially inwardly with the members 80 by the springs 94.

As indicated in the upper portion of FIG. 7, the plungers 76 are normally in axial alignment with their associated pocket members 58. In order to permit screws to be inserted into the pocket members at the loading station 16 and to be removed from the pocket members at the discharge station 24, a cam 102 is disposed within the peripheral flange 56 of the turret for engagement with the plunger elements 76. As shown in FIG. 1, the cam 102 is fixed to and supported by the bracket member 88, and the cam extends from a position slightly in advance of the unloading station 24 to a position terminating at the feeding funnel 72 at the loading station 16. The cam member 102 is constructed so as to engage the side of successive plungers 76 and deflect the plungers laterally out of alignment with the pocket members 58. The cam member 102 is positioned so that the plungers are laterally deflected slightly in advance of the unloading station 24 whereby finished screws may be ejected without interference from the plungers. It is to be noted that an aperture 104 is formed through the cam member 102 in alignment with the pocket members at the unloading station 24 so that finished screws may be ejected from the pocket member and through the aperture 104 and into a tube 106 or other suitable device for directing the ejected screw members to a desired point of discharge.

The cam member 102 terminates substantially in abutting relationship with the lower end of the feeding funnel 72 so that the plungers are directed around the feeding funnel. After the plungers pass the feeding funnel they are free to assume their normal position in axial alignment with their associated pocket members. It is to be noted that the head portions 78 of the plungers 76 are axially narrow and have rounded or beveled faces so that they are adapted to swivel within the guide members 80 as shown in the lower portion of FIG. 7. The springs 92 permit the slide elements 93 to yield inwardly for accommodating the swivel action of the plungers.

As shown in FIG. 1, the cam 86 is constructed so that the plungers 76 are radially retracted and withdrawn from the pocket members as they approach the unloading station 24 and until after they pass the loading station 16. Then the surface of the cam 86 rises so that the plungers are successively forced radially outwardly for clamping a screw element within an associated pocket member as the screw element approaches the work station 18. This clamping action is completed before the work station 18 is reached so that the screw member is positively and firmly held with its outer end exposed.

A rotary tool such as a grinder or milling cutter 108 is fixed on a rotatably mounted shaft 110 at the work station 18. The cutter 108 is provided with a V-shaped peripheral cutting edge in the same manner as the cutter 274 disclosed in copending application Serial No. 846,481 filed October 14, 1959, and now Patent No. 3,164,851 issued January 12, 1965 for forming the exposed ends of successive screw blanks with the previously described beveled end surfaces 34 and 36 which intersect each other along line 38. The arrangement is such that the beveled surfaces 34 and 36 are separated by and the line 38 is disposed in a vertical plane, or in other words, a plane perpendicular to the axis of rotation of the turret.

In order to drive the cuter 108, the apparatus is provided with an electric motor 112. An endless chain 114 extends around a sprocket 116 fixed on the output shaft 118 of the motor. The chain also encircles a larger diameter sprocket 120 which is fixed on an end portion of the shaft 110 extending through the frame structure 12 of the apparatus as shown in FIGS. 1 and 2.

The screws having the beveled end surfaces 34 and 36 formed thereon are successively conveyed from the work station 18 to the work station 20; where means 122 is located for simultaneously forming the above-described flutes or slots 40 and 42. This means comprises rotary tools or milling cutters 124 and 126 shown best in FIG. 6 and the mechanism shown best in FIGS. 1, 3, 4 and 5 for moving the cutters 126 and 124 into and out of engagement with a screw positioned at the work station 20. The cutters 124 and 126 are respectively fixed on shafts 128 and 130 which are disposed at and inclined oppositely relative to a vertical plane or, in other words, a plane perpendicular to the axis of the rotation of the turret and containing the central line or ridge 38 of a screw located at the work station. Thus the rotary cutters 124 and 126 are positioned during engagement with a screw for forming the slots 40 and 42 in the oppositely inclined relationships described above.

The shafts 128 and 130 are respectively rotatably supported in lower ends of depending bracket arms 132 and 134. The bracket arm 132 has an upper but intermediate portion pivotally mounted on a shaft 136 which is parallel to the shaft 128 and is supported at its opposite ends in bearing portions 138 and 140 of a frame member 142 which is fixed to the main frame structure 12. An upper but intermediate portion of the depending bracket arm 134 is similarly pivotally mounted on a shaft 144 which is parallel to the shaft 130. The shaft 144 has opposite ends thereof supported in bearing portions 146 and 148 of the frame member 142. With this arrangement it is seen that upon pivotal movement of the bracket arms 132 and 134 about the shafts 136 and 144, the cutters 124 and 126 will move in opposite directions along arcuate paths of travel between positions intersecting the path of travel of the ends of the screw members on the turret and positions radially outwardly of the path of travel of the screw members. In other words, when the arm members 132 and 134 are respectively pivoted in a clockwise direction and a counterclockwise direction as viewed in FIG. 1, they will be moved toward retracted positions radially spaced from the turret sufficiently to avoid engagement with the screw members and to permit the screw members to be fed to and from the work station 20.

The axes of the shafts 134 and 136 or, in other words, the axes of pivotal movement of the arms or brackets 132 and 134 are in parallel planes, but since these axes are oppositely inclined with respect to the vertical plane which contains the ridge line 38 of a screw at the work station 20, the cutters 124 and 126 engage the screw at opposite angles with respect to the ridge line 38. Thus, the portion of the line 38 which remains after the slots are formed provides a well-supported but sharp point for facilitating starting of a drilling action when the screw is applied to a workpiece, and the cutting edges 44 and 46 are inclined rearwardly from the edge 38 at opposite angles with respect to the axis of the screw for promoting a more effective cutting action.

The bracket arm 132 is provided with an upper end extension arm 150 which extends transversely of the lower portion and over the lower end of the shaft 144 and then upwardly along a side of the frame member 142. The arm 134 has a similar upper end extension 152 which extends transversely over the lower end of the shaft 136 and then upwardly along a side of the frame means 142 opposite from the arm 150. As shown best in FIG. 5, transversely extending cam followers 154 and 156 are respectively adjustably secured to the upper ends of the arm portions 150 and 152. The cam follower 154 is engageable with an eccentric cam 158 fixed on a rotatable shaft 160 and the cam follower 156 is engageable with another eccentric cam 162 fixed on the shaft 160. The arrangement is such that upon rotation of the shaft 160, the cams 158 and 162 simultaneously shift the upper ends of the arm portions 150 and 152 outwardly or permit the arm portions to move toward each other for causing the lower arm portions 132 and 134 and the rotary cutters carried thereby to move out of or into engagement with a screw element at the work station. Of course, rotation of the shaft 160 is timed with the movement of the turret so that the cutters will not interfere with a screw element while the turret is moving.

In order to maintain the cam follower 154 in engagement with the cam 158, a tension spring 164 is connected between a finger 166 secured to the arm portion 150 and a bracket 168 fixed on the frame means 142. A similar spring 170 is connected between a finger 172 on the arm portion 152 and a bracket 174 fixed on the frame means 142.

Another electric motor 176 is mounted on the frame means 12 for driving the cutters 124 and 126. The motor 176 is provided with a sprocket 178 on its drive shaft which drives a chain 180 encircling a larger diameter sprocket 182 fixed on the above-described shaft 136. A smaller sprocket 184 is also fixed on the shaft 136 and drives a chain 186 which in turn drives a sprocket 188 on the cutter shaft 128.

The shaft 136 also carries a helical gear 190 which meshes with a complementary gear 192 fixed on the shaft 144. The shaft 144 carries a sprocket 194 which drives a chain 196. The chain 196 encircles a sprocket 198 fixed on the cutter shaft 130.

After the slots or flutes have been formed in the sides of the screw at the work station 20, the screws are successively advanced to the work station 22. A rotary tool or cutter 197 is mounted on a shaft 199 at the work station 22. The cutter 197 has a configuration similar to the cutter 108 and is provided for removing any burrs or the like which may be formed around the entering end portion of a screw by the cutters 124 and 126.

The shaft 199 is rotatably supported on the frame structure 12 and carries a sprocket 201 which is driven from a motor 203 through a sprocket 205 on the motor drive shaft and an endless chain 207.

The screws are successively directed from the work station 22 to the unloading station 24 where they are aligned with an ejecting mechanism 209. This ejecting mechanism includes a mechanical plunger in alignment with a screw at the unloading station for forcing the screw radially inwardly from a pocket member 58 and into the aforementioned discharged tube 106. It is further contemplated that the ejector mechanism may comprise means for directing a blast of air for forcing a screw member into the tube 106, which means would include a valve structure operable in timed relationship with the movements of the turret. Of course, if a mechanical plunger is used, the plunger would also be actuated in timed relationship with the movements of the turret. In addition means, not shown, may be provided for applying suction to the discharged tube 106 for aiding in ejection and removal of the screws.

The apparatus is provided with drive means shown in FIGS. 1–3 for intermittently indexing the turret and for actuating the slot or flute cutting mechanism 122 in timed relationship with the turret. The drive means comprises a motor 175 mounted on the main frame structure 12 and connected to a speed reducer 177 with a drive shaft 179 which carries a sprocket 181. An endless chain 183 is driven from the sprocket 181 and serves to drive another sprocket 185 mounted on a rotatable drive shaft 187.

As shown best in FIG. 2, the shaft 187 carries a cam 189 and a gear 191. The gear 191 meshes with and drives an identical gear 193 fixed on a rotatable shaft 195.

An indexing plate 211 is fixed on the turret shaft 52 and includes a plurality of equally spaced peripheral notches 200 which are equal in number to and spaced the same as the screw receiving pocket members 58 on the turret. In order to actuate the indexing plate 211 and thus index the turret, a pall 202 is pivotally mounted by pin 204 on a carrier plate 206 for engagement in the notches 200. The plate 206 is pivotally mounted for oscillating movement around the axis of the turret shaft 52. In order to actuate or oscillate the plate 206, a connecting rod 208 is pivotally connected to the plate 206 by a pin 210 and is also pivotally connected to a pin 212 eccentrically mounted on the gear 193. A compression spring 214 is disposed between the pall 202 and an abutment 216 fixed on the oscillating plate 206 for urging the pall for engagement in the notches 200. The pall is provided with a projection 218 adapted to enter the notches 200, which projection includes an abutment surface 220 facing in a clockwise direction as viewed in FIG. 2 and parallel to an opposing face of a notch in which the projection is disposed for providing a driving connection between the pall and the indexing plate. The projection 218 also comprises a generally rearwardly facing inclined cam surface 222 for urging the pall outwardly for disengagement from the notch when the carrier plate is oscillated in a counterclockwise direction.

During each rotation of the gear 193, the connecting rod 208 is moved back and forth so that the pall 202 serves to engage and advance or index the disc 211 and thus the turret. The construction is such that each movement of the turret is sufficient to locate successive pocket members 58 at the various stations around the turret. In order to insure the proper positioning of the turret while the screw members are being processed at the work stations, means is provided for releasably but positively locking the indexing plate during the interval between each feeding movement thereof. This means comprises reciprocably and slidably mounted dogs 224 and 226 arranged in opposing relationship adjacent opposite peripheral portions of the plate 211. Compression springs 228 and 230 are provided for biasing the dogs for engagement in the notches 200 in the indexing plate 211. The dogs respectively include wedge shaped projecting portions 232 and 234 having opposite side surfaces inclined in the same manner as the opposite side surfaces of the notches 200 and adapted to mate with the notches for positively locking the indexing plate.

While the dogs are resiliently biased radially inwardly for engagement with the indexing plate notches, they are, of course, adapted to be shifted outwardly of the notches to the positions shown in FIG. 2 for releasing the indexing plate and permitting indexing movement of the plate and turret to take place. In order to control the dogs, a cam plate 236 is freely pivotally supported on a hub portion of the indexing plate 211 as shown in FIGS. 2 and 3. The dogs 224 and 226 have a width greater than the thickness of the indexing plate so that they overlie the cam plate 236 and engage the peripheral edge thereof. The cam plate 236 is formed with a pair of oppositely disposed lobes 238 and 240 which are adapted to shift the dogs from the slots 200 when the cam plate is in the position shown in FIG. 2.

In order to oscillate the cam plate 236 in timed relationship with the indexing pall 202, a gear sector 242 is pivotally mounted by a pin 244 for meshing engagement with a segment of gear teeth 246 formed on the cam plate 236. A tension spring 248 is connected between the gear sector 242 and a fixed part of the frame structure for urging the gear structure 242 in a clockwise direction as viewed in FIG. 2 for turning the cam plate 236 in a manner which permits the dogs to enter the notches 200. The previously mentioned cam 189 on the shaft 187 is disposed for engaging a roller or cam follower 252 mounted on the gear sector 242 by a stub shaft 254 for pivoting the gear sector 242 in a counterclockwise direction and actuating the cam member 236 for raising or retracting the dogs.

The gear 193 meshes with another gear 256 fixed on a rotatable shaft 258 which carries and drives the sprocket 260. An endless chain 262 is driven by the sprocket 260, which chain extends around rotatably supported idler sprockets 264, 266, 268, 270, 272 and 274. In addition the endless chain 262 extends around and drives a sprocket 276 which is supported on a shaft 278 and drives a gear 280 also on the shaft 278. As shown in FIGS. 2–5, the gear 280 meshes with a gear 282 fixed on the shaft 160 so that the shaft 160 and thus the cams 158 and 162 which control the movement of the cutter supporting bracket arms 132 and 134 are driven in timed relationship with the turret.

Referring now to FIGS. 10 through 19, there is shown an apparatus 300 incorporating another embodiment of the present invention. In this embodiment the apparatus comprises an endless conveyor or rotary turret 302 fixed on an upper end portion of a rotary shaft 304. The shaft 304 which is shown in FIG. 16 is provided by the output shaft of a transmission 306 shown in FIGS. 11 and 12, which transmission is of known construction so that it need not be described in detail. It suffices to state that the transmission 306 is constructed for intermittently rotating the turret, or in other words, for successively advancing the turret predetermined increments and then stopping the turret for short intervals during which the screw blanks are loaded, pointed and slotted and unloaded.

The transmission 306 is mounted on frame members 308 forming a part of an overall machine frame 310 which includes a table top member 312. An electric motor 314 or other suitable prime mover is mounted on a base portion 316 of the machine frame and has a sprocket 318 fixed on its output shaft 320. The transmission 306 has an input shaft 321 which is driven from the motor sprocket 318 by an endless chain 323 which meshes with another sprocket 325 fixed on the shaft 321. The chain 323 also meshes with another sprocket 327 fixed on a shaft 329 so that the shaft 329 is rotated in timed relationship with the movements and dwells of the turret or endless conveyor 302 for a purpose described more fully below.

As shown best in FIGS. 15 through 19, the endless conveyor or turret 302 is provided with a plurality of pocket means 322 which are adapted to receive and retain screw blanks 26. The pocket means 322 are equally spaced around a peripheral portion of the turret 302 and are disposed parallel to the axis of rotation of the turret. During rotation of the turret, the pocket means 322 are successively advanced to, stopped at and then advanced beyond a loading station 324, a first work station 326, a second work station 328, a third work station 330 and an unloading or ejecting station 332 as shown best in FIGS. 10 and 15. In the embodiment shown, the turret is provided with ten equally spaced pocket means 322 and since there are only five of the aforementioned stations, the turret is rotated an amount equal to one-half the distance between stations during each step in the intermittent motion of the turret.

As shown best in FIGS. 17, 18 and 19 each of the pocket means 322 comprises a tubular member 334 mounted in the turret plate 302 and extending downwardly therefrom and having an inverted frustoconical lower end portion 336. A second tubular member or collet 338 is disposed within the tubular member 334 and is retained against rotation relative thereto by a pin 340. The pocket element or collet 338 has an upper end portion 342 with a diameter sufficiently large to accommodate the head of the screw blank. The upper end portion 342 merges with an intermediate inverted frustoconical portion 344 which is complementary to and abuts against the frustoconical portion 336 of the outer sleeve 334. The intermediate portion 344 of the collet member provides a generally upwardly or axially facing seat 346 engageable with the underside of the screw blank head for positively limiting downward movement of the screw blank. The collet member 338 terminates in a lower end portion 348 extending downwardly from the annular seat 346 and providing a guide for supporting the shank of the screw blank while at the same time exposing an outer end portion of the shank as shown in FIG. 17. It is to be noted that the collet member 338 is formed with longitudinally extending slits 350 and 352 at opposite sides thereof which merge with transverse or peripheral slits 354 and 356 adjacent the upper end thereof. The slits 354 and 356 terminate short of each other and the longitudinal slits 350 extend into the frustoconical portion 344 and terminate short of the lower end of the collet member. With this structure, the collet member is adapted to collapse radially and grip the peripheral portion of a screw head when an axial clamping pressure is applied downwardly on the collet member for tending to axially shift the collet member downwardly relative to the outer sleeve 334. Upon the application of such a downward clamping pressure the frustoconical portion 336 of the outer sleeve tends to cam the collet member radially inwardly for accomplishing the above-mentioned gripping action. This clamping pressure is applied to the head end of the screw in a manner described below so that the screw is clamped not only against the abutment surface or seat 346 but is also peripherally gripped by the collet for preventing rotation of the screw relative to the collet and thereby enabling the slot and end surfaces to be formed accurately on the screw. It will be appreciated that the slotted and radially collapsible collet structure of this embodiment may be incorporated into the embodiment of FIGS. 1 through 7.

In order to apply the aforementioned clamping pressure to the screw blanks, clamping devices 358 are mounted for movement with the turret and in association with each of the pocket means 322. As shown in FIGS. 11, 12 and 16, each of the clamping devices 358 comprises a bracket 360 mounted for pivotal movement on a shaft 362 fixed on the turret 302 and extending parallel to the axis of rotation of the turret. Each bracket 360 is provided with a tubular outer end portion 364 parallel to the shaft 362 and slidably retaining a plunger 366 projecting upwardly therefrom and carrying a roller or cam follower 368 at its upper end. Another plunger or clamping element 370 has an enlarged head portion 372 slidably disposed in a bore 374 in the lower end of the plunger 366 and a reduced diameter shank of the plunger 370 projects downwardly from the bracket and is adapted to enter the collet of an associated pocket means and engage the upper end of the screw for clamping the screw against the annular seat 346 of the collet for providing the clamping action described above. A relatively heavy compression spring 376 is provided between the upper end of the bore 374 and the enlarged head 372 of the plunger 370 for resiliently urging the plunger downwardly in a manner which will permit it to retract in the event that a screw blank becomes jammed in the collet whereby to prevent injury to the apparatus. Another and relatively light compression spring 378 is disposed beneath the plunger head 372 and a closure member 380 at the lower end of the tubular bracket portion 364 for resiliently urging the plunger assembly including the plungers 366 and 370 upwardly for the purpose described below.

In order to actuate the plungers 366 and 370 for releasably clamping screw blanks in their associated pocket means 322, a cam 382 is concentrically disposed above the turret 302 and is fixedly mounted on a frame structure 384 supported on the table top 312 of the machine. As shown best in FIG. 16, the cam 382 has a downwardly facing cam surface 386 engageable with the rollers or cam followers 368 of the clamping devices for urging the plungers downwardly for clampingly engaging the screw blanks while their associated pocket means 322 are moving from the loading station past the work stations and toward the unloading station. In addition the cam surface 386 is formed for permitting the plungers to be raised by their associated springs 378 when the pocket means are at the loading and unloading stations.

It is, of course, necessary that the plungers 370 be in axial alignment with their associated pocket means during a screw clamping operation. In order to permit the screws to be loaded to and ejected from the pocket means, the clamping devices 358 are constructed for shifting their respective plungers or clamping elements 370 laterally and out of axial alignment with the pocket means when the pocket means are at the loading and unloading stations. More specifically the brackets 360 are, as described above, mounted for pivotal movement on the upstanding shafts 362. Each of the clamping devices 358 includes a spring 388 shown best in FIG. 16 and extending between an anchor 390 on the turret 302 and a pin 392 on the bracket 360. The spring 388 serves resiliently to bias the pivotally mounted bracket 360 toward a retracted position in which the plunger or clamping element 370 is laterally offset from the pocket means 322.

A cam 394 is mounted beneath the cam 382, which cam 394 presents a peripheral cam surface 396 engageable with rollers or cam followers 398 on each bracket 360 of each clamping device 358. The cam surface 396 is shaped so as to urge or pivot the brackets 360 for positioning the plungers 370 in axial alignment with their associated pocket means 322 while the pocket means are moving to and past the work stations. In addition the cam surface 396 is formed for permitting the springs 388 to pivot the brackets 360 toward the aforementioned retracted position when the clamping devices and their associated pocket means are at the loading and unloading stations.

As shown in FIGS. 10 and 11, a hopper 400 is mounted adjacent the turret for containing a supply of screw blanks to be processed. A track or chute 402 extends downwardly from the hopper to a loading mechanism 404 at the loading station 324. The supply hopper, feeding track and loading mechanism may be of various known constructions and need not be described in detail herein. It suffices to state that the loading mechanism 404 is connected electrically or mechanically with the drive means of the turret 302 for operation in timed relationship with the turret and is adapted axially to insert the screw blanks into successive pocket means 322 at the loading station.

In this embodiment, means 406 and 408 are disposed at the first work station 326 for mounting and actuating rotary cutters or saws 410 and 412 about oppositely inclined axes and at positions on opposite sides of the path of travel of the screw blanks for forming the slots 40 and 42 in opposite sides of the shanks of the screw blanks 26. The means 406 and 408 respectively include slides or carriage blocks 411 and 413 mounted for parallel relative movement on parallel guideways 414 and 416 respectively. Bearing units 418 and 420 shown best in FIG. 10 respectively rotatably support shafts 422 and 424 on which the previously mentioned rotary cutters 410 and 412 are fixed. It will be observed that the shafts 422 and 424 are oppositely inclined with respect to each other and are positioned so that the rotary cutters 410 and 412 are at opposite sides of the arcuate path of travel of the screw blanks.

Various means may be provided for mounting the bearing units 418 and 420 on the slide or carriage members 411 and 413 respectively, but in the embodiment shown upstanding brackets 426 and 428 are fixed on the carriage members 411 and 413 and are formed with vertical dovetailed grooves 430 and 432 for receiving complementary portions of vertically disposed slide members 434 and 436 on which the bearing units 418 and 420 are respectively fixed. Adjusting screws 448 and 450 are provided between the vertical slide members 434 and 436 and their respective upstanding brackets 426 and 428 for enabling the slide members 434 and 436 to be vertically adjusted relative to each other and to the turret. In addition, the bearing units 418 and 420 are of a known construction which enables the shafts 422 and 424 to be axially adjusted relative to each other and to the turret. This combination of axial adjustment of the shafts and vertical adjustment of the bearing units enables the rotary cutters to be accurately positioned with respect to the screw blanks.

In order to drive the shafts 422 and 424 and thus the cutters, electric motors 452 and 454 are mounted on and for movement with the slide or carriage members 411 and 413 respectively. The motor 452 is mounted by suitable bracket means so that it is parallel to the shaft 422 and sprockets 456 and 458 are respectively fixed on the output shaft of the motor and an end of the shaft 422 opposite from the cutter. An endless drive member or chain 460 provides a driving connection between the sprockets 456 and 458. The motor 454 is disposed parallel to the shaft 424 and a chain 462 encircles a sprocket 465 on the output shaft of the motor 454 and another sprocket 467 on the shaft 424.

The slide members 411 and 413 and thus the cutters carried thereby are adapted to be reciprocated in timed relationship with the turret for simultaneously advancing the cutters 410 and 412 in opposite directions into engagement with opposite sides of a screw blank as shown in FIG. 15a and for then retracting the cutters. The means for actuating the slide members 411 and 413 is shown in FIGS. 11, 12 and 14 and comprises connecting rods 464 and 466 respectively having ends connected to pins 468 and 470 which extend through suitable slots in the table top 312 and guides 416 and 418 and are connected to the bottoms of the slide members 411 and 413. Opposite ends of the connecting rods 464 and 466 are pivotally connected to pins 472 and 474 at opposite ends of a lever 476. The lever 476 is pivotally mounted on a shaft 478 and is rigidly connected with another lever 480 on the shaft having a roller or cam follower 482 at its outer end engageable with a rotary cam 484. The cam 484 is fixed on upstanding shaft 486 beneath the table top 312. As shown in FIGS. 11 and 12, the shaft 486 comprises an output shaft of a transmission 488 connected with and driven by the previously mentioned drive shaft 329. The transmission 488 may be of known construction so that it need not be described in detail and it suffices to state that the transmission and the cam 484 are constructed for oscillating the lever 480 and thus the lever 476 and the slide members 411 and 413 in timed relationship with the turret 302 for accomplishing the previously described simultaneous cutting and slotting of opposite sides of a screw blank at the work station 326. A spring 489 is connected with the lever 480 for maintaining the cam follower 482 in engagement with the cam 484.

In order to form the beveled surfaces 34 and 36 on the ends of the screw blanks and thereby provide the screws with pointed end portions, the apparatus 300 includes means 490 and 492 at the work stations 328 and 330 respectively for mounting rotary cutters or saws 494 and 496. The mounting means 490 and 492 are such that the saws are positioned for rotation about inclined axes and so that the peripheries thereof intersect the path of travel of the screw blanks for engaging opposite side portions of the ends of the screw blanks and forming the beveled surfaces and pointed ends as shown best in FIGS. 15b and 15c.

Except for the manner in which they are positioned, the mounting means 490 and 492 are essentially identical to the corresponding mounting means 406 and 408 described above and thus need not be described in detail. It suffices to state that the mounting means 490 and 492 respectively include slides or carriage blocks 498 and 500 mounted for reciprocal movement on guide members 502 and 504 fixed on the table top 312. Upstanding bracket means 506 and 508 are mounted on the slide members 498 and 500 respectively and adjustably support bearing units 510 and 512 which in turn axially adjustably support shafts 514 and 516. The rotary cutters or saws 494 and 496 are respectively fixed on the shafts 514 and 516. The shafts also carry sprockets 518 and 520 at ends thereof opposite from the saws, which sprockets are driven by endless chains 522 and 524 respectively. These chains are in turn driven from sprockets 526 and 528 on output shafts of electric motors 530 and 532 mounted by suitable bracket means on the slide members 498 and 500 respectively.

As shown in FIGS. 11, 12 and 14, means is provided for actuating the slide members 498 and 500 for moving the cutters 494 and 496 into and out of engagement with the screw blanks in timed relationship with the movement of the turret. This means is similar to the corresponding means described above for actuating the slide members 411 and 413. More specifically this actuating means comprises bell cranks 534 and 536 pivotally mounted on shafts 538 and 540 respectively beneath the table top 312. First ends of the bell crank are connected by pins 542 and 544 respectively to the slide members 498 and 500, which pins extend upwardly through suitable slots in the table top and the guide members 502 and 504. Opposite ends of the bell cranks are connected by pins 546 and 548 to connecting rods 550 and 552. These connecting rods are in turn connected by pins 554 and 556 to levers 58 and 60 pivotally mounted on a shaft 562 and rigidly interconnected with another lever 564. The lever 564 carries a roller or cam follower 566 on an outer end thereof for cooperative engagement with a rotatable cam 568 fixed on a shaft 570. A spring 571 is connected to the lever 564 for maintaining the follower 566 in engagement with the cam 568.

As shown in FIGS. 11 and 12 the shaft 570 is provided by an output shaft of a transmission 572 which corresponds to the previously described transmission 488 and is associated with and driven by the drive shaft 329. Thus the cam member 568 and the slide members 498 and 500 and the cutters or saws carried thereby are actuated in timed relationship with respect to the turret.

As shown in FIGS. 10, 12 and 15d, a mechanism 574 is disposed beneath the turret at the discharge station 332 for pushing finished screw blanks upwardly from the pocket means 322 at the discharge station and into a discharge chute 576. The ejecting mechanism comprises an air cylinder 578 connected by conduit 580 to a suitable source of air under pressure through control valve 582 adjacent the shaft 329 as shown best in FIGS. 11 and 13. A piston 584 is slidably disposed in a cylinder 578 and is resiliently biased by springs 586 toward a retracted position. A rod or knockout pin 588 is fixed to the piston and extends from the cylinder through a pressure chamber 590 fixed to one end of the cylinder and having an aperture slidably receiving the knockout pin and effectively closed by sealing means 592. A bore or passageway 594 extends from an outer end of the knockout pin or piston rod 588 to a location within the pressure chamber 590 and intersects a lateral port 596 formed in the rod for communicating with the interior of the pressure chamber. The pressure chamber is connected by a conduit 598 with a suitable source of air under pressure and preferably through the control valve 582.

The ejector device is disposed so that the knockout pin or piston rod 588 is in axial alignment with a pocket means 322 when the pockets means is stopped at the unloading station. Then upon actuation of the control valve 582 for admitting air under pressure to the lines 580 and 598, the knockout pin 588 is forced upwardly for mechanically striking and pushing a screw axially upwardly. This mechanical action assures loosening of the screw in the event the screw is jammed within the collet of the pocket means. After the screw has been mechanically loosened in this manner, a jet of air which is directed axially into the collet from the bore 594 blows the screw upwardly and out of the pocket means and into the discharge chute 576.

In order to actuate the ejector means in timed relationship to the rotation of the turret, the control valve 582 is located adjacent the shaft 329 as mentioned above. A cam 600 is fixed on the shaft for cooperating with and actuating the control valve 582 in the desired manner.

As shown in FIGS. 10 and 15, an electric eye 602 is mounted above the turret and in alignment with the arcuate path of travel of the pocket means 322 and a light source 603 beneath the turret. The electric eye is provided for sensing the presence or absence of a screw blank in pockets means 322 and more specifically for inspecting the pocket means between the unloading station and the loading station to make sure that the blanks have been ejected at the unloading station. The electric eye is electrically connected with the loading mechanism 404 in a manner such that when the electric eye sees light through a pocket means, the mechanism 404 is permitted to load another blank into said pocket means and when the electric eye fails to see a light through a given pocket means as a result of the pocket means being blocked by a screw blank or any other item, the loading mechanism 404 will be deenergized and prevented from attempting to load a blank into the blocked pocket means.

It is to be noted that the electric eye is located so as to be offset from the pocket means when the turret is stopped and the alternate pocket means are aligned with the various stations. More specifically the electric eye is preferably located between the pocket means at the loading station and the immediately adjacent pocket means mid-way between the loading and unloading stations. As a result the electric eye will only be in alignment with a pocket means while the turret is moving. When the turret is stopped the electric eye will be in alignment with a solid portion of the turret disc. Therefore, the apparatus is provided with means for activating the electric eye circuit only when the turret is moving and a pocket means 322 is substantially in alignment with the electric eye. More specifically the electric eye circuit includes an activating switch 604 adjacent the drive shaft 329 and adapted to be engaged and operated by a cam 606 fixed on the shaft 329. The arrangement is such that the cam 606 closes the switch 604 to energize the electric eye circuit during movement of the turret and substantially only while a pocket means is in general alignment with the electric eye. The remainder of the electric eye circuit may be of known construction and need not be described in detail herein. It suffices to state that the circuit is such that when the electric eye control switch 604 is closed and the electric eye fails to see light through an aligned pocket means a suitable relay is energized which will prevent the loading means from loading a blank into the blocked pocket means when such pocket means arrives at the loading station.

While the operation of the apparatus is believed to be clear from the above description a brief résumé of the method of forming screw blanks in accordance with the present invention is as follows. The screw blanks are successively fed from a suitable source of supply to the conveying means at the loading station and are then intermittently advanced along a predetermined arcuate path of travel from the loading station past a plurality of work stations to an unloading station. During movement of the screw blanks from the loading station substantially to the unloading station the head portions of the blanks are both axially clamped and radially gripped so as to preclude rotation of the blanks around their own axes and at the same time the blanks are supported so that free outer end portions of the shanks thereof are exposed. When the blanks are positioned at one work station, rotary cutters or saws revolving around oppositely inclined axes are simultaneously advanced from opposite sides of the path of travel against opposite sides of the exposed screw shank for simultaneously forming oppositely inclined slots in the shank, which slots intersect the end portion of the shank and provide the previously described cutting edges. At another work station additional rotary cutter means is advanced into and out of engagement with the exposed end of a screw blank for forming the previously described beveled surfaces and pointed end on the blank. In the first embodiment described herein both beveled surfaces are simultaneously formed by a single cutter having a V-shaped groove while in the second embodiment the beveled surfaces are formed in separate operations at work stations spaced along the path of travel. One advantage of the second embodiment is that very simple and standard cutters or saws may be used forming the beveled surfaces while the embodiment of FIGS. 1 through 7 requires a special cutter having V-shaped peripheral cutting teeth. After the cutting operations have been completed, the blanks are mechanically knocked loose from their respective collets and are then ejected with the aid of a blast of air from the collets.

While the preferred embodiments of the present invention have been shown and described herein, it is obvious that many structural details may be changed without departing from the spirit and scope of the appended claims.

The invention is claimed as follows:

1. An apparatus for making screws having a pointed entering end portion and oppositely disposed and inclined slots intersecting said end portion, comprising means for conveying successive blanks having exposed shanks along a path of travel, means at one station adjacent said path of travel for mounting slot forming tools for rotation about oppositely inclined axes at opposite sides of said path of travel and for moving said tools for substantially simultaneously forming oppositely inclined slots in a blank with said slots inclined at an oblique angle relative to a longitudinal axis of the blank, and means adjacent said path of travel for forming said pointed end portions on successive blanks.

2. An apparatus as defined in claim 1, which includes means for intermittently actuating said conveying means, and means for actuating said mounting means in timed relationship with conveying means.

3. An apparatus as defined in claim 1, wherein said conveying means includes means for clamping the blanks for resisting rotation of the blanks about their own axes.

4. An apparatus, as defined in claim 1, wherein said conveying means comprises tubular pockets for axially receiving said blanks, and means axially engageable with the blanks in said pockets for clamping the blanks and resisting rotation of the blanks about their own axes.

5. An apparatus, as defined in claim 1, wherein said conveying means comprises a plurality of generally tubular and radially collapsible collets having generally axially facing annular seats and adapted axially to receive said blanks with shanks of the blanks extending axially upwardly through said seats, and clamping elements associated with said collets for axially engaging the blanks and clamping the blanks against said seats and causing radial collapsing of the collets for gripping the blanks.

6. An apparatus, as defined in claim 1, wherein said means for mounting tool means for forming pointed end portions on the blanks comprises means for mounting a single rotary cutter having a peripheral V-shaped configuration for beveling and pointing opposite sides of successive screw blanks.

7. An apparatus, as defined in claim 1, wherein said means for mounting tool means for forming said pointed end portions comprises first and second means disposed at spaced locations along said path of travel for supporting first and second rotary saws for respectively sawing and beveling opposite sides of and thereby pointing the end portions of successive blanks.

8. An apparatus, as defined in claim 1, wherein said conveying means comprises a rotatable turret including blank accommodating pockets for receiving and retaining blanks and locating shanks of said blanks substantially radially with respect to the turret.

9. An apparatus, as defined in claim 1, wherein said conveying means comprises a rotatable turret including a plurality of circumferentially spaced generally axially extending pockets for receiving and retaining successive blanks and locating shanks of said blanks substantially parallel with respect to an axis of said turret.

10. An apparatus, as defined in claim 1, wherein said conveying means comprises a plurality of spaced pockets for axially receiving and retaining successive blanks, said apparatus including means for ejecting processed blanks from said pockets comprising an axially shiftable knock-out element successively alignable with said pockets, means providing a passageway through said knock-out element for directing a jet of air through said knock-out element and toward successive pockets.

11. An apparatus, as defined in claim 1, which includes means disposed adjacent said path of travel for ejecting processed blanks from the conveyor, and electric eye means disposed in alignment with the path of travel downstream from said ejecting means for inspecting the conveying means for proper ejection of the blanks.

12. An apparatus, as defined in claim 11, wherein said conveying means is intermittently advanced and stopped and includes a plurality of spaced blank receiving and retaining pockets, said electric eye means being disposed at a location offset from said pockets when the conveying means is stopped so as to be in alignment with a pocket only during the movement of the conveying means, and means operable in timed relationship with the conveying means and connected with said electric eye means for activating the electric eye means only when said conveying means is moving and a blank receiving pocket is substantially in alignment with the electric eye means.

13. An apparatus as set forth in claim 1 wherein said slot forming tools overlap said path of travel.

14. An apparatus for making screws having shanks with pointed entering end portions and slots in sides thereof and having enlarged heads, comprising an endless intermittently movable conveyor means, a plurality of pocket means spaced on said conveyor means for receiving and retaining screw blanks with shanks of the blanks exposed, said pocket means including abutment surfaces engageable with the heads of the blanks, a plurality of clamping elements movable with said conveyor means and respectively associated with said pocket means for releasably clamping heads of the blanks against said abutment surfaces of the pocket means, means for actuating said clamping elements in timed relationship with said conveyor means, means disposed adjacent said conveyor means for mounting slot forming tool means on oppositely inclined axes for simultaneously forming oppositely inclined slots in exposed shanks of the blanks, and additional means adjacent said conveyor means for mounting cutter means for forming the pointed end portions on the exposed shanks of the blanks.

15. An apparatus, as defined in claim 14, wherein said abutment surfaces of said pocket means face generally axially for engaging generally axially facing surfaces of the blank heads, said clamping elements being axially alignable with associated pocket means and being axially shiftable for engagement with ends of the blank heads.

16. An apparatus, as defined in claim 15, wherein said clamping elements and said pocket means are generally radially disposed with respect to an axis of rotation of said endless conveyor means.

17. An apparatus, as defined in claim 15, wherein said clamping elements and said pocket means are disposed generally parallel to an axis of rotation of said endless conveyor means.

18. An apparatus for making screws having slotted shanks with pointed entering ends and enlarged heads comprising an endless conveyor, a plurality of generally tubular pocket means spaced on said conveyor for axially receiving and retaining successive blanks with shanks of the blanks exposed for movement with the conveyor between loading and unloading stations and past work stations, a plurality of clamping means movable with said conveyor and respectively associated with each of said pocket means and including axially shiftable clamping elements axially alignable with said pocket means, means for shifting said clamping elements out of alignment with said pocket means while the pocket means are at the loading and unloading stations and for axially shifting the clamping elements against heads of blanks in the pocket means while the pocket means are moving from the loading station toward the unloading station, means disposed at a work station adjacent said conveyor for mounting slot forming tool means for forming slots in exposed shanks of said blanks, and additional means disposed at another work station adjacent said conveyor for mounting cutter means for forming the pointed ends on the exposed shanks of the blanks.

19. An apparatus as set forth in claim 18 wherein each of said pocket means is axially slit and radially collapsible for gripping the periphery of a screw blank head in response to the application of a clamping force on the screw blank head.

20. An apparatus, as defined in claim 18, wherein said means for actuating the clamping elements comprises a cam mounted for axially shifting the clamping elements toward associated pocket means.

21. An apparatus, as defined in claim 20, wherein said clamping means are mounted on and movable with said conveyor and said cam is mounted in fixed relationship with respect to said conveyor.

22. An apparatus, as defined in claim 17, wherein each of said clamping means comprises a pivotally mounted bracket supporting said clamping element for axial movement, said brackets being pivotal between operative positions in which their respective clamping elements are in axial alignment with their associated pocket means and retracted positions, a first cam disposed for actuating said brackets between said operative and retracted positions, and a second cam for axially shifting said clamping elements.

23. An apparatus for making screws having slotted shanks with pointed entering ends and enlarged heads; comprising an endless conveyor, a plurality of tubular pocket elements for axially receiving and retaining successive screw blanks with shanks of the blanks exposed and said pocket elements being advanced by said conveyor from a loading station to an unloading station, each of said pocket elements having a generally annular axially facing seat engageable with a head of a screw blank, each of said axially facing seats having a relatively small diameter aperture at a first end portion of said seat and a relatively large diameter substantially cylindrical screw guiding portion integrally connected to a second end portion of said seat, clamping means movable with said conveyor and associated with each of said pocket elements for releasably applying a clamping force to the heads of screw blanks associated with said pocket elements, means disposed adjacent said conveyor for slotting exposed shanks and for forming the pointed ends on the shanks, and a fluid pressure actuated plunger disposed at said unloading station for alignment with successive pocket elements and operable for engaging exposed ends of the shanks and shifting the screw blanks axially outwardly of the pocket elements, said plunger having a fluid passageway therethrough for directing a jet of air against an engaged screw blank for completing the ejection of the blank from the pocket elements.

24. An apparatus as set forth in claim 23 wherein each of said pocket means is axially slit and radially collapsible for gripping the periphery of a screw blank head in response to the application of a clamping force on the screw blank head.

25. An apparatus for producing screws of the type described comprising means for intermittently conveying successive screws from a loading station along a predetermined path of travel, said conveying means including means for retaining successive screws with free entering ends of the screws exposed, means at first work station adjacent said path of travel for mounting a rotary tool for shaping said exposed ends of successive screws at said first work station and providing said end with beveled faces, means at a second work station adjacent said path of travel for shiftably supporting a pair of rotary tools mounted on oppositely inclined axes for simultaneously cutting slot means in generally opposite sides of an exposed end portion of successive screws and intersecting said beveled faces, and means for actuating said last mentioned means and said conveying means in timed relationship.

26. An apparatus, as defined in claim 25, wherein said means at said second work station comprises a pair of shafts for supporting said tools disposed at opposite sides of and inclined oppositely with respect to said plane containing the axes of the screws.

27. An apparatus, as defined in claim 26, wherein said means at said second work station includes bracket means supporting said shafts for movement toward and away from said path of travel and in planes traversing said path of travel.

28. An apparatus for producing screws of the type described comprising means for intermittently conveying successive screws along an arcuate path of travel around a predetermined axis, said conveying means including means for retaining successive screws and exposing free entering ends of the screws, means for supporting first and second rotary tools with their axes inclined to said predetermined axis and angularly displaced with respect to one another and with their cutting planes positioned in planes inclined to a longitudinal axis of the screws and with said cutting planes intersecting one another, drive means for substantially simultaneously moving said first and second rotary tools into engagement with said screws to cut inclined slots with said slots positioned at an oblique angle relative to the longitudinal axis of the screws, and means for actuating said drive means and said conveying means in timed relationship.

29. An apparatus as set forth in claim 28 wherein said cutting planes overlap said path of travel.

30. An apparatus for producing screws of the type described comprising means for intermittently conveying successive screws along an arcuate path of travel extending around a predetermined axis, said conveying means including pocket members for receiving and retaining successive screws with free entering ends thereof exposed and with the axes of the screws extending substantially in a predetermined plane when the screws are at a work station, means at said work station adjacent said path of travel for shiftably supporting a pair of rotary tools for rotation about axes respectively oppositely inclined with respect to said plane for simultaneously cutting slots in generally opposite sides of an exposed portion of successive screws at said work station, and means for actuating said last mentioned means and said conveying means in timed relationship.

31. An apparatus, as defined in claim 30, wherein said conveying means includes a plurality of radially shiftable plunger means respectively aligned with said pocket means for releasably clamping screws within the pocket means.

32. An apparatus, as defined in claim 31, wherein said conveying means includes a first cam member disposed for controlling axial movement of said plunger means for clamping and releasing screws within the pocket means, and a second cam member disposed for laterally shifting said plunger means along a predetermined portion of the arcuate path of travel for permitting screw members to be loaded into and discharged from the pocket means.

33. An apparatus for producing screws of the type described comprising turret means mounted for rotation about a predetermined axis, a plurality of tubular pocket members mounted on said turret means for receiving and retaining successive screws with free entering ends of the screws exposed, reciprocable plunger means on said turret means in alignment with said tubular pocket members for releasably clamping screws within the tubular pocket members, means at a first work station adjacent the periphery of said turret means and including a rotary tool mounted for rotation about an axis parallel to said first mentioned axis for shaping the exposed end of successive screws at said work station and providing said end with beveled faces intersecting each other along a line disposed in a plane perpendicular to said first mentioned axis, means at a second work station adjacent said turret means for shiftably supporting a pair of rotary tools for simultaneously cutting slots in generally opposite sides of an exposed end portion of successive screws and intersecting said beveled faces and said line, said last mentioned means including a pair of oppositely inclined shafts at opposite sides of said plane for supporting said rotary tools, bracket arms respectively supporting said shafts, and means supporting said bracket arms for pivotal movement about axes respectively parallel to their associated shafts, and means for pivoting said bracket arms and for actuating said turret means in timed relationship.

34. An apparatus for producing screws of the type described comprising means for intermittently conveying successive screws along a predetermined path of travel with entering ends of the screws exposed and axes of the screws extending outwardly of the path of travel, means at a work station adjacent to said path of travel for shiftably supporting a pair of rotary tools for simultaneously cutting slots in opposite sides of an exposed end portion of successive screws, said last mentioned means comprising oppositely inclined tool mounting elements for supporting the rotary tools for rotation about oppositely inclined axes, bracket arms respectively supporting said tool supporting elements, means pivotally mounting said bracket arms for movement about axes parallel with the axes of rotation of their associated rotary tool and means for actuating said bracket arms in timed relationship with said conveying means.

35. An apparatus, as defined in claim 34, wherein said tool supporting elements comprise shafts rotatably supported by said bracket arms, said means pivotally supporting said bracket arms comprises additional rotatably supported shafts, said apparatus including means for driving said shafts including drive means directly between each of the second mentioned shafts and the tool supporting shaft associated with its bracket arm, and meshing gears on said second mentioned shaft whereby all the shafts rotate in unison.

36. An apparatus, as defined in claim 34, wherein said bracket arms include portions extending oppositely from said tools and beyond said means pivotally mounting the arms, and said means for actuating said bracket arms comprises rotatable cams disposed for engagement with said arm portions.

37. An apparatus as set forth in claim 34 wherein said rotary tools overlap said path of travel.

38. A method of making screws of the type described, comprising the steps of intermittently conveying successive screw blanks having head portions and axially extending shank portions along a predetermined path of travel with said shank portions thereof exposed, substantially simultaneously moving cutters rotating around oppositely inclined axes against substantially opposite sides of the exposed shank portion of successive screw blanks at a predetermined work station and thereby simultaneously forming oppositely inclined slots in the shank portions, and shaping exposed terminal ends of successive screw blank shank portions at another work station along said path of travel spaced from first mentioned work station and thereby forming intersecting beveled faces on said terminal ends of the shank portions.

39. A method as defined in claim 38, which comprises axially clamping head portion of successive screw blanks moving along said path of travel for restraining screw blanks against rotation about their own axes.

40. A method as defined in claim 38, comprising the step of substantially radially gripping the head portions of the screw blanks moving along said path of travel and thereby resisting rotation of the screw blanks about their own axes.

41. A method as defined in claim 38, comprising the step of axially clamping and radially gripping head portions of screw blanks moving along said path of travel for retaining the screw blanks against rotation about their own axes.

42. A method as defined in claim 38, comprising simultaneously forming said converging beveled faces on the terminal ends of said shank portions.

43. A method as defined in claim 38, comprising forming one of said beveled faces on the terminal ends of the shank portions at one work station and forming another of said beveled faces on said terminal ends of the shank portions at another work station.

44. A method as defined in claim 38, comprising ejecting successive screw blanks from said path of travel by mechanically striking the successive blanks and then directing an air jet against the successive blanks.

45. A method as defined in claim 38, wherein said method includes the step of reciprocating said rotary cutters in substantially straight lines toward and away from opposite sides of said screw blanks.

References Cited by the Examiner
UNITED STATES PATENTS

| | | | |
|---|---|---|---|
| 1,408,916 | 3/1922 | Wilcox | 10—20.5 |
| 2,383,313 | 8/1945 | Hoffman et al. | 192—125 |
| 2,561,966 | 7/1951 | Baumle | 10—2 |
| 2,820,973 | 1/1958 | Farmer | 10—107 |
| 2,969,553 | 1/1961 | Hatherell et al. | 10—107 |
| 3,164,851 | 1/1965 | Hanneman | 10—2 |

ANDREW R. JUHASZ, *Primary Examiner.*